W. H. BASS.
Detaching Horses.

No. 154,634.   Patented Sept. 1, 1874.

Witnesses:
John Becker
Fred Haynes

W. H. Bass
by his Attorneys
Brown & Allen

UNITED STATES PATENT OFFICE.

WILLIAM H. BASS, OF ROANOKE, ALABAMA, ASSIGNOR OF ONE-HALF HIS RIGHT TO BENJAMIN F. WEATHERS, OF SAME PLACE.

IMPROVEMENT IN DETACHING HORSES.

Specification forming part of Letters Patent No. 154,634, dated September 1, 1874; application filed August 4, 1873.

*To all whom it may concern:*

Be it known that I, WILLIAM H. BASS, of Roanoke, in the county of Randolph and State of Alabama, have invented an Improved Safety Single-Tree for Wagons, of which the following is a specification:

This invention has for its object to enable the driver of a carriage or other vehicle to instantaneously release the horse in case of a runaway or other accident, and to make the animal self-detaching, if the driver should desire to let the same stand in the shafts. If, in such case, the animal should start, it would be released from the vehicle at the moment of starting, thus preventing loss and injury of the vehicle without the trouble of unhitching the horse every time it is left standing in harness.

The invention consists in making the single-tree of two pieces, and pivoting each piece at its center to the cross-bar of the shafts. The two contiguous ends of the two pieces are connected together by winding around them a strong strap, fastened with one end to the center of the cross-bar, and extending to the buggy-body, preferably into the body, under the dash, and over the front sill of the same, and there fastened by means of a button, or otherwise, to said sill, so as to be in reach of the driver. If the driver should desire to detach the horse he must unbutton the strap, thereby releasing the two adjoining ends of the single-tree, and the horse pulling at the outer ends of the single-tree will swing both parts thereof around parallel to the shafts. The traces will then become released from the trace-hooks of the single-tree, and the horse will be detached.

Figure 1:
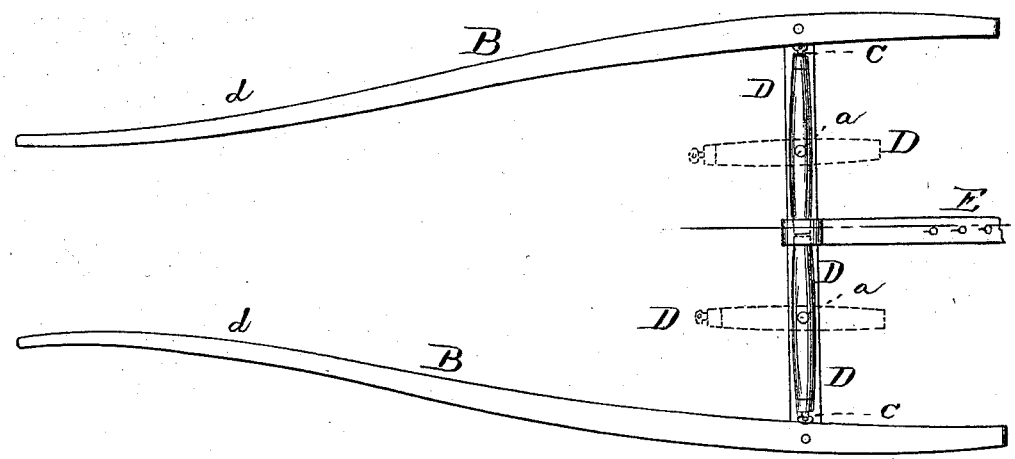
Figure 2:
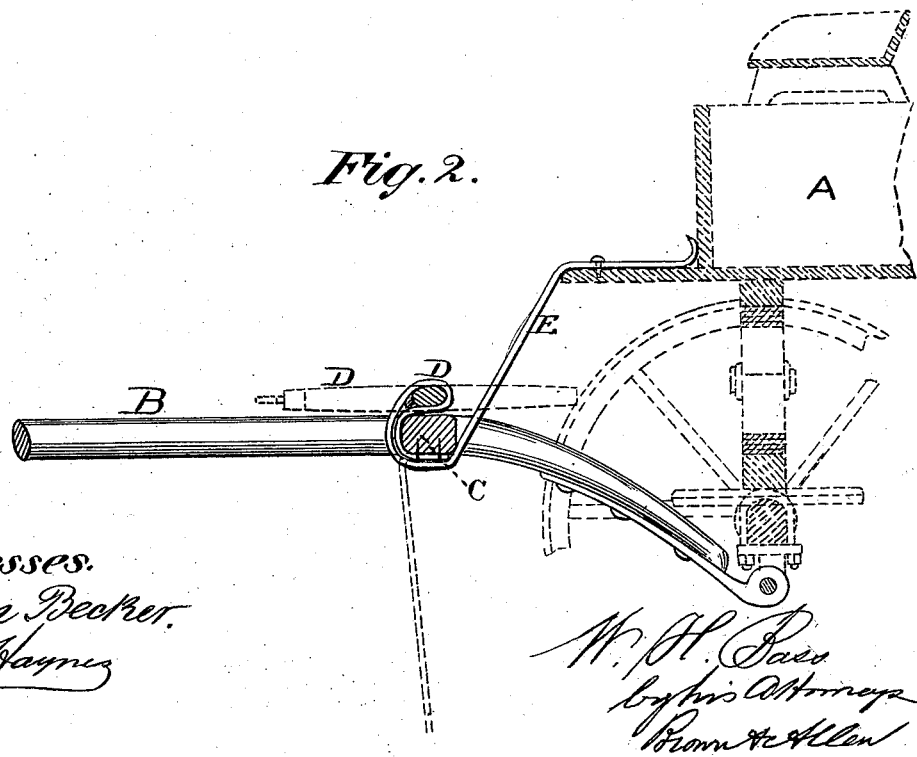

In the drawing, Figure 1 is a top view of my improved safety single-tree when applied, the dotted lines showing the position of the same when the strap is loosened. Fig. 2 is a side view of the same partly in section.

Similar letters of reference indicate corresponding parts in both figures.

A is the front part of a vehicle, with shafts B B attached in the usual manner. C is the cross-bar connecting the shafts. The single-tree, which is made in two pieces, D D, of equal lengths, has each of these pieces pivoted at its center to the cross-bar, as shown at $a\ a$ in Fig. 1. The two parts of the single-tree, when in the position shown by full lines in Fig. 1, nearly come in contact at the center of the cross-bar B. A strong strap, E, is fastened with one end to the center of said cross-bar B, and is slung around the two inner ends of the parts D D of the single-tree, by preferably passing it backward between the cross-bar B and single-tree D D, then forward around the top of the single-tree, thence around B again, downward; finally up to the wagon-body under the dash, and over the front sill of the body, and there fastened to a button on said sill, all as plainly shown in Fig. 2. The usual plan of attaching the holding-back strap to the shafts is dispensed with, this strap passing up to the leather cuff of the harness-saddle, which supports the shafts. The hooks $d\ d$ on the front part of the shafts are intended to prevent the saddle-cuff from running too far down the shaft.

To release the horse, the driver has only to lift the strap E from the button, which will then allow the two ends D D of the single-tree to pass from said strap E and swing around the pivots $a\ a$ to a position parallel to the shafts B, as shown by the dotted lines in Figs. 1 and 2. The traces will then immediately be released from the trace-hooks of the single-tree, and the horse, consequently, be detached from the vehicle.

I am aware that a single-tree made in two parts, and both of said parts being pivoted to the cross-bar of the shafts so as to be held in line with the cross-bar or turned on its pivots at right angles therewith, is not new.

What I claim as my invention is—

In combination with the two pivoted single-trees D D, the strap E, having one end secured to the bottom of the cross-bar C, and passed around and over the two inner ends of the single-tree, and extended to the body of the vehicle, as and for the purposes set forth.

WILLIAM H. BASS.

Witnesses:
WILLIAM E. WHITE,
BIRD CULBERTSON.